United States Patent
Kikuzumi et al.

(10) Patent No.: US 10,074,866 B2
(45) Date of Patent: Sep. 11, 2018

(54) MEMBRANE ELECTRODE ASSEMBLY FOR POLYMER ELECTROLYTE FUEL CELL, METHOD OF PRODUCING THE SAME AND POLYMER ELECTROLYTE FUEL CELL

(71) Applicant: Panasonic Intellectual Property Management Co., Ltd., Osaka (JP)

(72) Inventors: Shinya Kikuzumi, Osaka (JP); Masahiro Mori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 456 days.

(21) Appl. No.: 14/409,943

(22) PCT Filed: Jun. 3, 2013

(86) PCT No.: PCT/JP2013/003474
§ 371 (c)(1),
(2) Date: Dec. 19, 2014

(87) PCT Pub. No.: WO2014/006817
PCT Pub. Date: Jan. 9, 2014

(65) Prior Publication Data
US 2015/0333352 A1    Nov. 19, 2015

(30) Foreign Application Priority Data

Jul. 2, 2012    (JP) ................. 2012-148239

(51) Int. Cl.
*H01M 8/10*    (2016.01)
*H01M 8/24*    (2016.01)
(Continued)

(52) U.S. Cl.
CPC ....... *H01M 8/1004* (2013.01); *H01M 8/0267* (2013.01); *H01M 8/1018* (2013.01);
(Continued)

(58) Field of Classification Search
CPC ............. H01M 8/1004; H01M 8/1018; H01M 8/1062; H01M 8/1069; H01M 8/1081;
(Continued)

(56) References Cited

U.S. PATENT DOCUMENTS

2002/0051901 A1    5/2002    Zuber et al.
2006/0046121 A1    3/2006    Shimohira et al.
(Continued)

FOREIGN PATENT DOCUMENTS

EP    2642569 A1    9/2013
JP    10-172587 A    6/1998
(Continued)

OTHER PUBLICATIONS

Machine Translation of: JP 2005/302526A, Kinoshita et al., Oct. 27, 2005.*
(Continued)

*Primary Examiner* — Kenneth J Douyette
(74) *Attorney, Agent, or Firm* — McDermott Will & Emery LLP

(57) ABSTRACT

An object of the present invention is to provide a membrane-electrode-frame assembly which suppresses reductions in power generation properties due to gas cross leakage of a polymer electrolyte fuel cell, which improves durability of a polymer electrolyte membrane and which exhibits superior productivity. In the membrane-electrode-frame assembly, an unwoven fabric which has two domains each having different pore sizes and which is formed with fibers of PVDF is disposed as a reinforcing membrane in a polymer electrolyte membrane for a polymer electrolyte fuel cell, and a domain having a smaller pore size and protruding from the polymer electrolyte membrane and a frame are formed into an integrated structure by welding, thereby improving a gas sealing capability.

11 Claims, 8 Drawing Sheets

(51) Int. Cl.
*H01M 8/00* (2016.01)
*H01M 8/1004* (2016.01)
*H01M 8/1018* (2016.01)
*H01M 8/1081* (2016.01)
*H01M 8/0267* (2016.01)
*H01M 8/2483* (2016.01)
*H01M 8/1062* (2016.01)
*H01M 8/1069* (2016.01)
*H01M 8/242* (2016.01)

(52) U.S. Cl.
CPC ....... *H01M 8/1062* (2013.01); *H01M 8/1069* (2013.01); *H01M 8/1081* (2013.01); *H01M 8/242* (2013.01); *H01M 8/245* (2013.01); *H01M 8/2483* (2016.02); *H01M 2008/1095* (2013.01); *H01M 2250/10* (2013.01); *H01M 2250/20* (2013.01); *Y02B 90/14* (2013.01); *Y02E 60/521* (2013.01); *Y02P 70/56* (2015.11); *Y02T 90/32* (2013.01)

(58) Field of Classification Search
CPC .... H01M 8/02; H01M 8/0271; H01M 8/0289; H01M 8/1058; H01M 8/1016
See application file for complete search history.

(56) References Cited

U.S. PATENT DOCUMENTS

| | | | |
|---|---|---|---|
| 2006/0068258 A1* | 3/2006 | Kinoshita | H01M 4/926 429/483 |
| 2006/0154127 A1 | 7/2006 | Eritate et al. | |
| 2009/0039540 A1 | 2/2009 | Nouji | |
| 2009/0246592 A1* | 10/2009 | Kinoshita | H01M 8/0291 429/483 |
| 2010/0062304 A1* | 3/2010 | Okanishi | H01M 8/0273 429/481 |
| 2010/0098989 A1 | 4/2010 | Morimoto et al. | |
| 2010/0227255 A1* | 9/2010 | Nakanishi | B82Y 30/00 429/497 |
| 2011/0311897 A1 | 12/2011 | Kato | |
| 2013/0273455 A1 | 10/2013 | Mori et al. | |

FOREIGN PATENT DOCUMENTS

| | | |
|---|---|---|
| JP | 2000-195333 A | 7/2000 |
| JP | 2003-077494 A | 3/2003 |
| JP | 2005-302526 A | 10/2005 |
| JP | 2006-100267 A | 4/2006 |
| JP | 2008-251314 A | 10/2008 |
| JP | 2009-064769 A | 3/2009 |
| JP | 4335305 B2 | 7/2009 |
| JP | 2009-245639 A | 10/2009 |
| JP | 2010-170823 A | 8/2010 |
| JP | 2013-062240 A | 4/2013 |
| WO | 2008-093658 A1 | 8/2008 |
| WO | 2011/149732 A2 | 12/2011 |
| WO | 2012/093432 A1 | 7/2012 |

OTHER PUBLICATIONS

The Extended European Search Report dated Jun. 17, 2015 for related European Patent Application No. 13812570.3.
International Search Report issued in PCT/JP2013/003474, dated Jul. 16, 2013, with English translation.

* cited by examiner

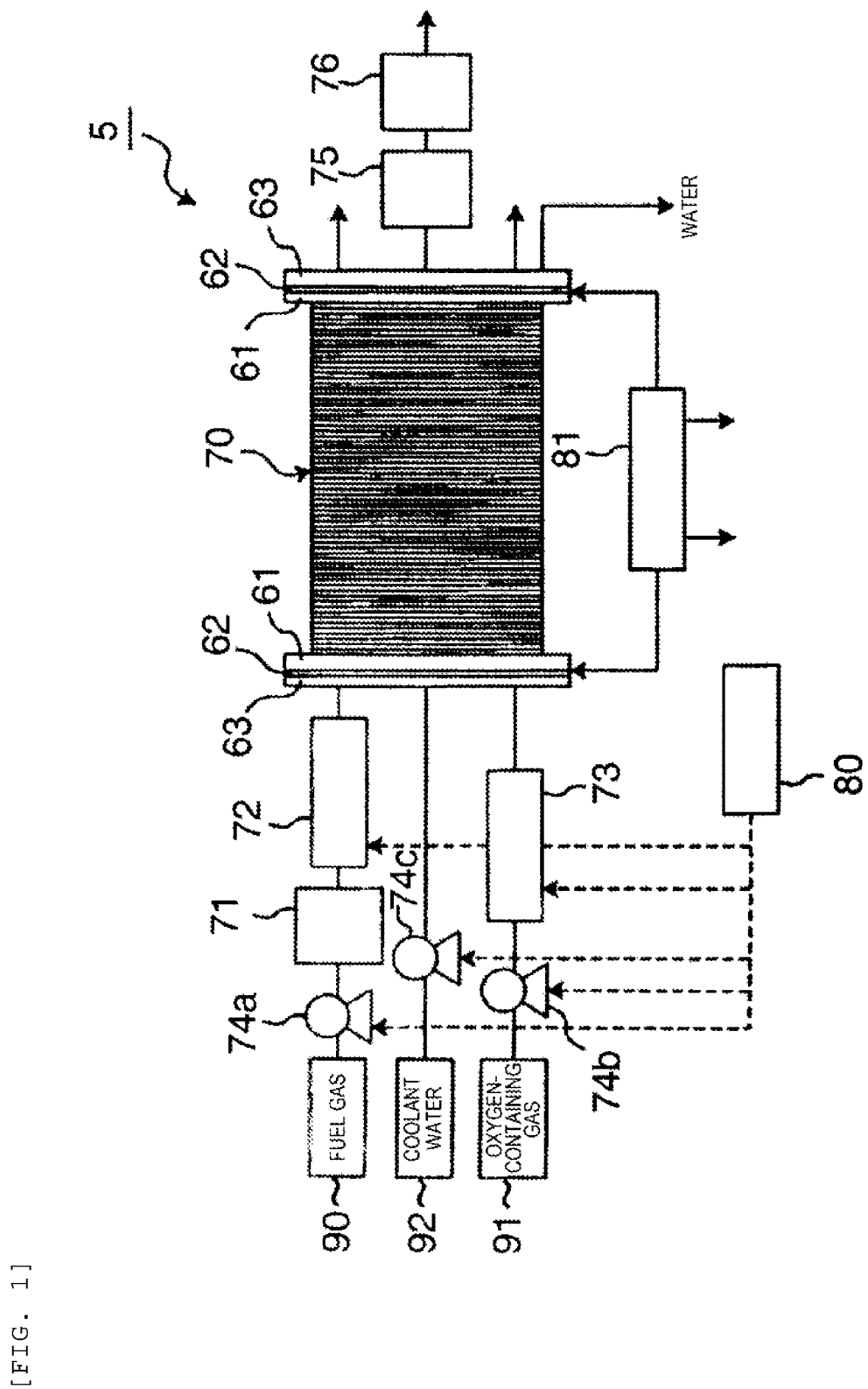
[FIG. 1]

[FIG. 2]
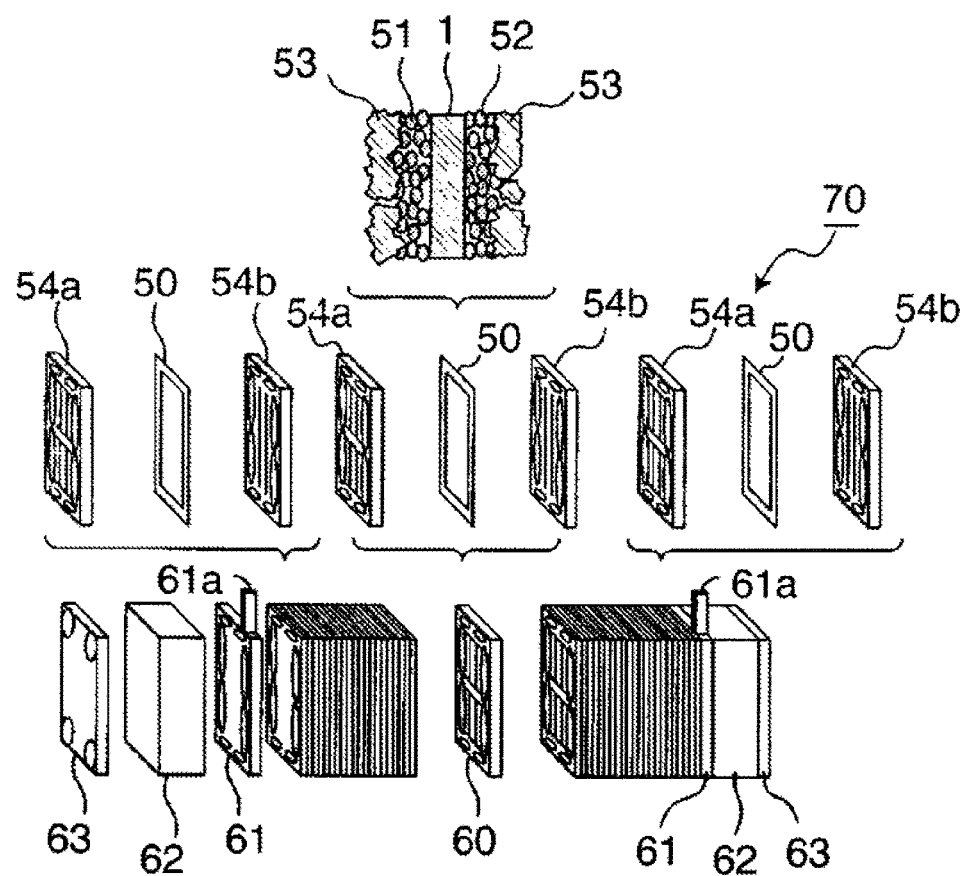

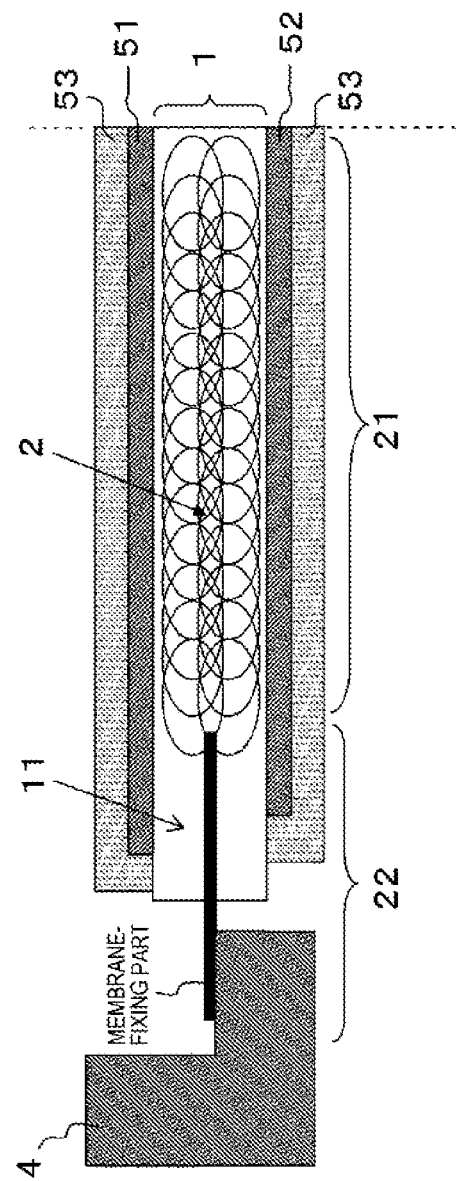
[FIG. 3]

[FIG. 4]
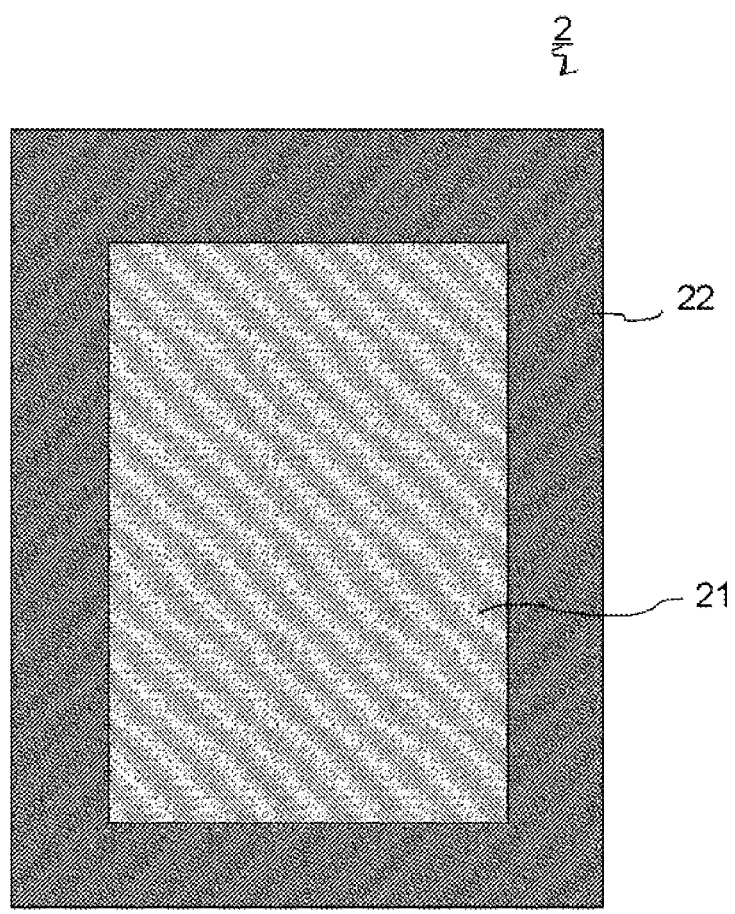

[FIG. 5]
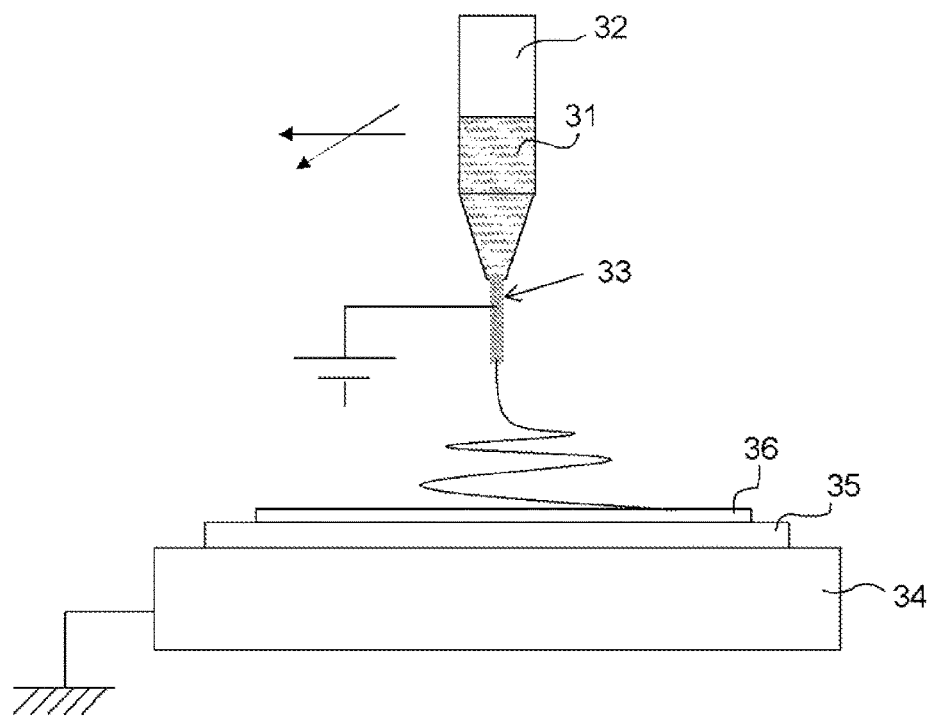
[FIG. 6A]
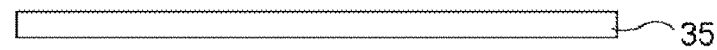
[FIG. 6B]
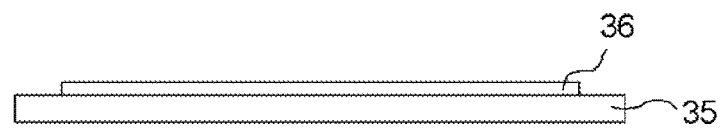
[FIG. 6C]
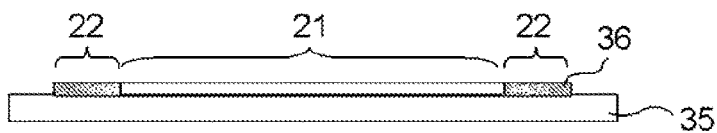

[FIG. 7A]
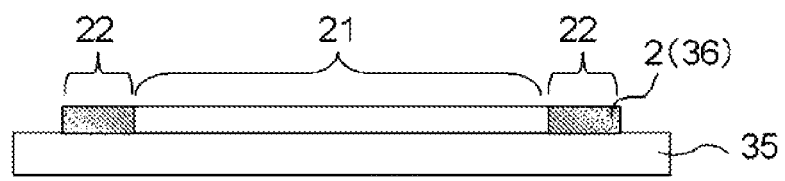
[FIG. 7B]
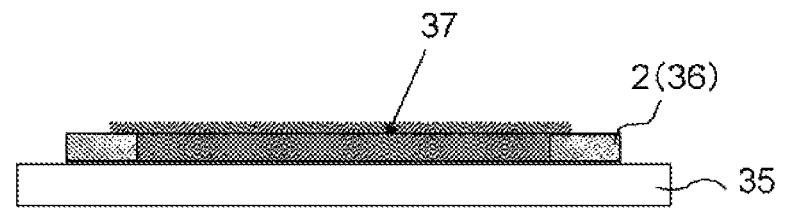

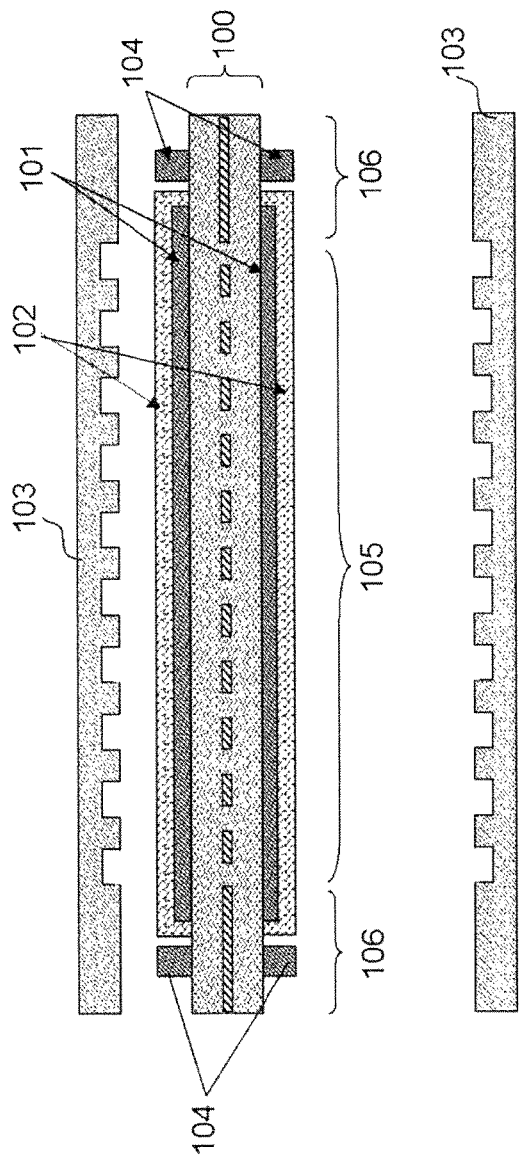
[FIG. 8]
PRIOR ART

[FIG. 9A]
PRIOR ART
[FIG. 9B]
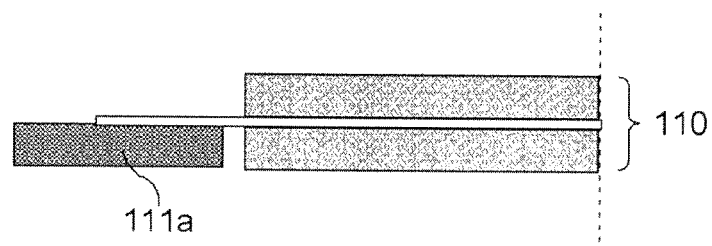
[FIG. 9C]
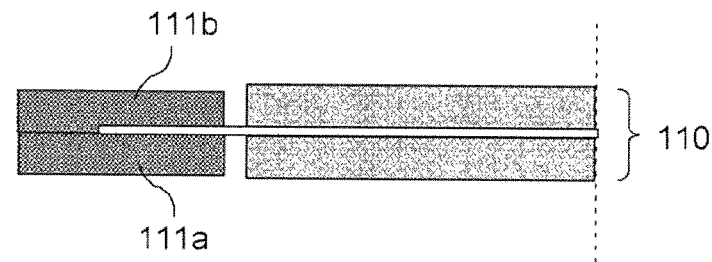

MEMBRANE ELECTRODE ASSEMBLY FOR POLYMER ELECTROLYTE FUEL CELL, METHOD OF PRODUCING THE SAME AND POLYMER ELECTROLYTE FUEL CELL

RELATED APPLICATIONS

This application is the U.S. National Phase under 35 U.S.C. § 371 of International Application No. PCT/JP2013/003474, filed on Jun. 3, 2013, which in turn claims the benefit of Japanese Application No. 2012-148239, filed on Jul. 2, 2012, the disclosures of which Applications are incorporated by reference herein.

TECHNICAL FIELD

The present invention relates to a membrane electrode assembly used for a polymer electrolyte fuel cell.

BACKGROUND ART

As to polymer electrolyte fuel cells (PEFC), catalyst layers and gas diffusion layers are joined in that order to both external surfaces of an electrolyte membrane, where an electric power generation occurs, to thereby form a membrane electrode assembly, the membrane electrode assembly is held between a pair of separators to form a single cell, and a plurality of single cells are stacked to thus form a polymer electrolyte fuel cell.

In recent years, proton-conductive ion exchange membranes are used for electrolyte membranes. In particular, since cation-exchange membranes which include a perfluorocarbon polymer having a sulfonic group are superior in basic properties, such cation-exchange membranes have widely been studied. In addition, outer peripheries of electrolyte membranes are often supported by resin frames.

Moreover, a recessed groove is disposed in an inner portion of a separator. The groove serves as a gas flow channel when a membrane electrode assembly is disposed against the separator. Furthermore, a gasket may be disposed between the end of the separator and the electrolyte membrane in order to secure a gas sealing capability, i.e. in order to prevent outside leakage of a fuel or oxidant gas. In this way, the gasket exists between the separator and the electrolyte membrane, and thus, plays a role in sealing the gas flow channel from the outside.

When a fuel gas containing hydrogen, and an oxidant gas containing oxygen, such as the air, are supplied to a polymer electrolyte fuel cell in the above-described structure, the fuel gas is electrochemically reacted with the oxidant gas through the electrolyte membrane. By use of this principle, the polymer electrolyte fuel cell can simultaneously generate electric power, heat and water.

In a polymer electrolyte fuel cell, the following reactions occur, thereby generating electrical energy.

At an anode: $H^2 \rightarrow 2H^+ + 2e^-$    (1)

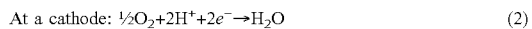

At a cathode: $\frac{1}{2}O_2 + 2H^+ + 2e^- \rightarrow H_2O$    (2)

However, in a conventional polymer electrolyte fuel cell, cross leakage of the gas may occur from a minute gap between the electrolyte membrane and the frame. The term "cross leakage" refers to a phenomenon in which a portion of the gas, which has been supplied to the inside of the cell, passes through the narrowest gap caused between the inner periphery of the frame and the electrode, and thus, the gas leaks from either of the anode side or the cathode side to the other side.

In order to improve a power generation efficiency in fuel cells, it is required to reduce such cross leakage of the gas.

As methods for solving the above-described problem, a technique in which an imperforate sheet is disposed inside the electrolyte membrane, and a technique in which the frame is formed by injection molding have been proposed (for example, see Patent Literatures 1 and 2). In addition, techniques described in Patent Literatures 3 to 7 have also been known.

FIG. 8 is a schematic diagram of a single cell in a conventional fuel cell.

In Patent Literature 1, a domain 1 (105) which has proton conductivity is present throughout an electrolyte membrane 100 in the thickness direction, while a domain 2 (106) which does not have proton conductivity and which is located around the outer peripheral portion of the domain 1 (105) is present throughout the membrane in the thickness direction by disposing an imperforate sheet therein. Further, portions from the outer peripheries of catalyst layers 101 to the outer peripheries of gas diffusion layers 102, where both the layers are disposed at both surfaces of the electrolyte membrane, are located in the domain 2 (106). In addition, a technology in which gaskets 104 are disposed therein to reduce cross leakage of the gas is disclosed in Patent Literature 1. A pair of separators 103 is also disposed at both sides of the gas diffusion layers 102.

FIGS. 9A, 9B and 9C are schematic illustrations of a method for producing a membrane electrode assembly for a conventional fuel cell.

Patent Literature 2 discloses a technology in which a frame 111b is formed by injection molding such that the inner peripheral portion of a membrane electrode assembly 110 is disposed inside a frame 111a, and thus, adhesiveness between peripheral areas of the membrane electrode assembly 110 and frames 111a and 111b is improved, thereby reducing cross leakage of the gas (FIGS. 9A to 9C).

CITATION LIST

Patent Literature

PTL 1: JP-A-2006-100267
PTL 2: Japanese Patent No. 4335305, Publication
PTL 3: WO2008/093658
PTL 4: JP-A-2009-064769
PTL 5: JP-A-2010-170823
PTL 6: JP-A-10-172587
PTL 7: JP-A-2000-195333

SUMMARY OF INVENTION

However, in the structure of Patent Literature 1, it is required to secure a gas sealing capability with a gasket. Furthermore, in the structure of Patent Literature 2, there is a problem that the production method is complicated.

An object of the present invention is to provide a membrane electrode assembly which has a higher gas sealing capability and which suppresses the cross leakage. Furthermore, another object of the present invention is to secure properties of a fuel cell for a long term by forming a polymer electrolyte fuel cell with the membrane electrode assembly.

In order to achieve the above-described objects, the membrane electrode assembly for a polymer electrolyte fuel cell according to the present invention has the following features.

[1] In a membrane electrode assembly for a polymer electrolyte fuel cell, having: a polymer electrolyte membrane; catalyst layers and gas diffusion layers which are disposed at both surfaces of the polymer electrolyte membrane; and a reinforcing membrane which includes an unwoven fabric having domains each having different pore sizes, the membrane electrode assembly has a first domain of the reinforcing membrane which is included in the polymer electrolyte membrane, and a portion of a second domain, which is disposed around an outer peripheral portion of the first domain and which has a pore size smaller than a pore size of the first domain, protrudes from a peripheral portion of the polymer electrolyte membrane.

[2] In above [1], the membrane electrode assembly is characterized in that the pore size of the first domain of the unwoven fabric is 0.035 μm or more to 5 μm or less, and the pore size of the second domain is 0.035 μm or less.

[3] In above [1] or [2], the membrane electrode assembly is characterized in that fibers of the unwoven fabric include PVDF, PVF, a copolymer including a plurality of monomer units constituting a polymer selected from among PVDF and PVF, or a mixture of these polymers, and a mean fiber diameter of the fibers is 0.01 μm or more to 1 μm or less.

[4] In above [1], the membrane electrode assembly is characterized in that pores in the first domain of the reinforcing membrane are filled with a perfluorocarbon polymer having a sulfonic group.

Also, the membrane-electrode-frame assembly for a polymer electrolyte fuel cell according to the present invention has the following features.

[5] The membrane-electrode-frame assembly is characterized in that a peripheral portion of the membrane electrode assembly in above [1] is held by a frame which is formed with a resin, and the membrane electrode assembly and the frame are formed into an integrated structure.

Moreover, the polymer electrolyte fuel cell of the present invention has the following features.

[6] The polymer electrolyte fuel cell is characterized by including one or more single cells which are stacked, wherein the one or more single cells each have a pair of separators which are disposed such that the membrane-electrode-frame assembly for a polymer electrolyte fuel cell according to above [5] is held between the pair of separators.

Furthermore, the method of producing a membrane electrode assembly for a polymer electrolyte fuel cell according to the present invention has the following features.

The method of producing a membrane electrode assembly for a polymer electrolyte fuel cell is characterized by carrying out, against an unwoven fabric, a method selected from among thermocompression bonding, filling of a same type of a material and laser welding, to produce a reinforcing membrane having a first domain and a second domain in the unwoven fabric, wherein the second domain is located around an outer peripheral portion of the first domain, and has a pore size smaller than a pore size of the first domain, and wherein the unwoven fabric is a unwoven fabric formed by spinning of a mixture solution of PVDF, PVF, a copolymer including a plurality of monomer units constituting a polymer selected from among PVDF and PVF, or a mixture of these polymers, and a solvent, using an electrospinning method. Additionally, the method is further characterized by filling pores in the first domain of the reinforcing membrane with an electrolyte material.

In addition, the method of producing a membrane-electrode-frame assembly for a polymer electrolyte fuel cell according to the present invention has the following features.

[8] A peripheral portion of a reinforcing membrane which includes an unwoven fabric having domains each having different pore sizes in a polymer electrolyte membrane, and a frame are formed into an integrated structure by a method selected from welding using heat, laser, ultrasonic waves or a solvent, and an adhesive.

According to the above structures, the gas sealing capability can be improved outside a region for power generation of the electrolyte membrane, and thus, the power generation efficiency can be improved. Furthermore, since such an improvement in the gas sealing capability can confine movement of OH radicals which are responsible for deterioration of the electrolyte membrane, power generation properties of the fuel cell can be secured for a long term.

BRIEF DESCRIPTION OF DRAWINGS

FIG. 1 is a schematic diagram of a fuel cell according the present embodiment.

FIG. 2 is a schematic diagram of a stack according to the present embodiment.

FIG. 3 is a schematic diagram of a cross-section of a membrane-electrode-frame assembly according to the present embodiment.

FIG. 4 is a schematic diagram of a reinforcing membrane according to the present embodiment.

FIG. 5 is a schematic diagram of fiber-forming equipment used in the present embodiment.

FIG. 6A is a diagram showing a PET substrate in the step of producing a reinforcing membrane according to the present embodiment.

FIG. 6B is a diagram showing a state where an unwoven fabric is formed on the PET substrate in the step of producing a reinforcing membrane according to the present embodiment.

FIG. 6C is a diagram showing a state where a second domain having no through-hole is formed around a peripheral portion of the unwoven fabric in the step of producing a reinforcing membrane according to the present embodiment.

FIG. 7A is a diagram showing a state where a reinforcing membrane is formed on the PET substrate 35 in the step of producing an electrolyte membrane according to the present embodiment.

FIG. 7B is a diagram showing a state where the first domain of the reinforcing membrane and an area other than the outer peripheral portion of the second domain present around the peripheral portion of the first domain are impregnated with an electrolyte solution in the step of producing an electrolyte membrane according to the present embodiment.

FIG. 8 is a schematic diagram of a conventional solid polymer electrolyte membrane.

FIG. 9A is a diagram showing a frame in a conventional membrane-electrode-frame assembly.

FIG. 9B is a diagram showing a state where an inner peripheral portion of a membrane electrode assembly is disposed inside the frame in a conventional membrane-electrode-frame assembly.

FIG. 9C is a diagram showing a state where an inner peripheral portion of a membrane electrode assembly is held between a pair of frames in a conventional membrane-electrode-frame assembly.

DESCRIPTION OF EMBODIMENTS

Hereinafter, embodiments of the present invention will be described based on FIGS. 1 to 7.

FIG. 1 shows a schematic configuration diagram of a polymer electrolyte fuel cell of the present invention.

A fuel cell 5 simultaneously produces electric power, heat and water by electrochemically reacting a fuel gas 90 containing hydrogen with an oxidant gas 91 containing oxygen.

The fuel cell 5 includes a stack 70 having a stacked structure in which a plurality of single cells each including a pair of electrodes, i.e. an anode and a cathode, are tandemly connected; a fuel processor 71 which extracts hydrogen from the fuel gas 90; an anode humidifier 72 which humidifies the fuel gas containing hydrogen extracted in the fuel processor 71; a cathode humidifier 73 which carries out humidification of the oxidant gas 91; and pumps 74a and 74b for each supplying the fuel gas 90 and the oxidant gas 91.

A fuel-supplying apparatus which supplies the fuel gas 90 to the single cells is formed in the fuel cell 5 by the fuel processor 71, the anode humidifier 72 and the pump 74a. Furthermore, an oxidant-supplying apparatus which supplies the oxidant gas to the single cells of the stack 70 is also formed therein by the cathode humidifier 73 and the pump 74b.

In addition, the fuel-supplying apparatus and the oxidant-supplying apparatus can adopt other various forms as long as they have functions for carrying out supply of the fuel or oxidant. However, in the present embodiment, when they are supplying apparatuses which equally supply the fuel gas 90 or the oxidant gas 91 to the plurality of single cells included in the stack 70, effects according to the present embodiment described below can favorably be obtained.

Moreover, the fuel cell 5 includes a pump 74c for circulation and supply of coolant water 92, which efficiently eliminates heat generated in the stack 70 during power generation; a heat exchanger 75 for carrying out heat exchange with a fluid, such as tap water, against heat eliminated by the coolant water (for example, a liquid having no conductive properties (e.g. pure water) is used therefor); and a hot water storage tank 76 which stores tap water which had been subjected to the heat exchange. Furthermore, the fuel cells includes an operation-controlling apparatus 80 which associates the above-described components with one another to thereby control operation of power generation; and an electricity output part 81 which extracts electricity generated in the stack 70.

A schematic exploded view of the stack 70 is shown in FIG. 2.

A plurality of single cells 60 are stacked, and the stacked single cells are clamped by collector plates 61, insulating plates 62 and end plates 63 from both the sides at a predetermined load, to thus form the stack 70. A current-extracting terminal part 61a is provided in each of the collector plates 61, and, during power generation, electric currents, i.e. electricity, is extracted from this part.

Each insulating plate 62 insulates a region between the collector plate 61 and the end plate 63, and an inlet port and an outlet port for a gas or coolant water (not shown in the figures) may be provided therein. End plates 63 each clamp and hold the plurality of stacked single cells 60, collector plates 61 and insulating plates 62 at a predetermined load with a pressurizing means (not shown in the figures).

As shown in FIG. 2, the single cell 60 is formed by holding a membrane electrode assembly 50 between a pair of separators 54a and 54b. The separators 54a and 54b may be gas-impermeable conductive materials, and, for example, that obtained by cutting a resin-impregnated carbon material into a predetermined shape, or that obtained by molding a mixture of carbon powder and a resin material is generally used.

Recessed grooves are formed in portions of separators 54a and 54b which come into contact with the membrane electrode assembly 50, and the grooves come into contact with gas diffusion layers 53, thus forming gas flow channels for supplying the fuel gas or oxidant gas to electrode planes and for carrying an excess gas away therefrom. For the gas diffusion layers 53, those formed by carbon fibers can generally be used as their substrates, and, for example, carbon fiber-woven fabrics can be used as the substrates.

As shown in FIG. 2, an anode-side catalyst layer 51 containing, as a main component, carbon powder carrying a platinum-ruthenium alloy catalyst is formed at the anode-surface side of the polymer electrolyte membrane 1, a cathode-side catalyst layer 52 containing, as a main component, carbon powder carrying a platinum catalyst is formed at the cathode-surface side, and gas diffusion layers 53 combining permeability of the fuel gas or oxidant gas and electron conductivity are each disposed on the outer surfaces of the anode-side catalyst layer 51 and the cathode-side catalyst layer 52, thus forming the membrane electrode assembly 50.

A schematic diagram of a cross-section of the membrane-electrode-frame assembly is shown in FIG. 3.

The polymer electrolyte membrane 1 internally includes a reinforcing membrane 2 of an unwoven fabric including fibers of a polyvinylidene difluoride polymer (hereinafter, referred to as "PVDF"). The reinforcing membrane 2 has domains each having different pore sizes, and has a first domain 21 of the unwoven fabric, and a second domain 22 which is located around the outer peripheral portion of the first domain 21 and which has a pore size smaller than a pore size of the first domain 21 (FIG. 4).

The pore size of the first domain 21 is preferably 0.035 µm or more to 5 µm or less. When the pore size is smaller than 0.035 µm, because the fiber content in the reinforcing membrane 2 increases, transmission of protons in the polymer electrolyte membrane 1 is impeded, thus impairing power generation properties of the fuel cell. On the other hand, when the pore size is larger than 5 µm, the content of the fibers, which serve as a reinforcing material for the polymer electrolyte membrane 1, decreases, and therefore, changes in the size of the polymer electrolyte membrane 1 due to its swelling cannot be suppressed. The pore size of the second domain 22 is preferably 0.035 µm or less. When the pore size is larger than 0.035 µm, since a sufficient gas sealing capability cannot be secured, the power generation efficiency of the fuel cell may be lowered.

In addition, the lower limit of the pore size of the second domain 22 is not defined due to the measuring limit of measurement equipment. The outer peripheral portion of the second domain 22 is fixed directly to the frame 4. An electrolyte material 11 is filled into pores in the first domain 21 of the reinforcing membrane 2 and a portion of the second domain 22. Since the fibers including PVDF that constitute the reinforcing membrane 2 have a tensile strength higher than that of the electrolyte material 11 including a sulfonic acid-type perfluorocarbon polymer, the reinforcing membrane 2 severs as a reinforcing material for the polymer electrolyte membrane 1, and therefore, can control swelling of the polymer electrolyte membrane 1 caused by its inclusion of water. Accordingly, deterioration of the membrane can be suppressed, and the durability will be higher.

The fibers are produced by the electrospinning method. The mean fiber diameter is preferably 0.01 µm or more to 1 µm or less. When the fiber diameter is smaller than 0.01 µm, the content of fibers which serves as a reinforcing material for the polymer electrolyte membrane 1 may decrease, and changes in the size of the polymer electrolyte membrane 1 by its swelling cannot be suppressed. On the other hand, when the fiber diameter is larger than 1 μm, the fiber content in the reinforcing membrane 2 increases. Therefore, the proton transmission in the polymer electrolyte membrane 1 is impeded, and power generation properties of the fuel cell are impaired.

The polymer electrolyte membrane 1 including fibers can generate electric power as the fuel cell by transmission of protons through the electrolyte material 11 which is filled into pores in the reinforcing membrane 2.

Additionally, as to an outermost layer present at one side or both sides of the polymer electrolyte membrane 1, the reinforcing membrane 2 may be exposed on the outer most layer, or the outermost layer may be coated by the first electrolyte material 11. When the reinforcing membrane 2 is exposed on the outermost layer, the surface area of the electrolyte membrane will increase, thereby improving power generation properties of the fuel cell.

Because the polymer electrolyte membrane 1 reaches 80° C. during operation of the fuel cell, as to qualities of a material for the reinforcing membrane 2, the material should has sufficient thermotolerance and chemical stability even in such a temperature region, and should be capable of being formed into unwoven fibers by the electrospinning method. In these points, PVDF may favorably be used as the material for the reinforcing membrane 2.

As materials for the reinforcing membrane 2 other than PVDF, a polyvinyl fluoride polymer (hereinafter, referred to as "PVF"), a copolymer including a plurality of monomer units constituting a polymer selected from among PVDF and PVF, or a mixture of these polymers may be adopted, and any materials which have thermotolerance/chemical resistance and which can be subjected to the electrospinning method may be adopted. Additionally, a material having hydrophobicity is more favorable. When unwoven fibers of such a material having hydrophobicity is disposed inside the polymer electrolyte membrane 1, unnecessary water produced inside the polymer electrolyte membrane 1 due to the power generation reaction can be discharged therefrom, and thus, unnecessary swelling of the membrane due to the produced water can be reduced.

In the present embodiment, in order to reduce changes in the size of the polymer electrolyte membrane 1 due to its swelling and contraction, it is preferable that the mechanical properties such as a tensile strength or degree of extension be favorable one. When the molecular weight is too small, the mechanical strength may be lowered. On the other hand, when the molecular weight is too large, the solubility may be deteriorated, thus making it difficult to form a solution thereof. Therefore, the molecular weight of the PVDF used therein is preferably 150,000 to 550,000.

In the present embodiment, in order to form fibers of PVDF by the electrospinning method, it would be better to dissolve PVDF using dimethylacetamide (hereinafter, referred to as "DMAc") as a solvent to generate a solution thereof. As for the solvent, dimethyl sulfoxide, dimethylformamide, acetone or the like can also be adopted. When a polar solvent is used, PVDF can easily be dissolved. The solution concentration is preferably 10% to 25%. When the solution concentration is low, a sufficient fiber diameter cannot be obtained, and, consequently, changes in the size of the polymer electrolyte membrane 1 due to its swelling and contraction cannot be suppressed. On the other hand, when the solution concentration is high, in a fiber formation by the electrospinning method, a sufficient electrostatic explosion may not occur, and, consequently, fibers cannot be obtained.

FIG. 5 shows a schematic diagram of equipment where fibers are produced, and then, an unwoven fabric 36, which is processed into the reinforcing membrane 2, is formed using the fibers.

In the present embodiment, in formation of PVDF fibers by the electrospinning method, a mixture solution 31 of PVDF and a solvent is charged to a syringe 32, and a needle-like nozzle 33 is used for a solution-discharging nozzle. The inner diameter of the nozzle is preferably ϕ0.18 mm to ϕ0.42 mm. When the inner diameter of the nozzle is small, the discharging amount becomes smaller, and, consequently, the productivity may be lowered. On the other hand, when the inner diameter of the nozzle is made larger, the discharging amount becomes larger, and, consequently, an electrostatic explosion cannot properly be caused, and fibers may not be formed.

In the present embodiment, an air-pulse dispenser (not shown in the figures) may be used for the discharge. The solution-feeding pressure is preferably 10 kPa to 50 kPa. When the solution-feeding pressure is low, a sufficient amount of the mixture solution 31 of PVDF, an electrolyte material and a solvent may not be discharged, and, consequently, the productivity may be lowered. On the other hand, when the solution-feeding pressure is made larger, the discharging amount becomes larger, and, consequently, an electrostatic explosion cannot properly be caused, and fibers may not be formed. The discharging amount will vary depending on the viscosity of the solution. Therefore, the solution-feeding pressure may be increased when the viscosity is higher, while the solution-feeding pressure may be decreased when the viscosity is lower. In this way, the solution-feeding pressure may be controlled so as to result in an appropriate discharging amount.

In the present embodiment, a PET substrate 35 is placed on a collector 34, a voltage is applied to the nozzle 33, and the collector 34, which collects fibers, is connected to a ground wire. While relatively moving the syringe 32 and the collector 34, the mixture solution 31 is discharged from the nozzle 33, and fibers discharged from the nozzle 33 is spread onto on the plate-like PET 35 substrate to thereby form an unwoven fabric 36.

The electric field between the nozzle 33 and the collector 34 is preferably 10 kV to 50 kV. When the electric field is weak, a sufficient electrostatic explosion may not be obtained, and suitable fibers having a mean fiber diameter of 0.01 μm or more to 1 μm or less cannot be obtained. On the other hand, when the electric field is strong, the time required for the mixture solution 31 of PVDF, an electrolyte material and a solvent discharged from the nozzle 33 to reach the collector 34 may be shortened. Consequently, a sufficient electrostatic explosion cannot be obtained, and suitable fibers having a mean fiber diameter of 0.01 μm or more to 1 μm or less cannot be obtained. In the present embodiment, although the positive voltage is applied to the nozzle 33, there is a case where a negative charge may be applied thereto, depending on a material to be formed into fibers. The polarity of the applied voltage may be selected depending on the type of the material.

The distance from the tip of the nozzle 33 to the collector 34 is preferably 90 mm to 160 mm. When the distance from the tip of the nozzle 33 to the collector 34 is short, the time from when the mixture solution 31 of PVDF, an electrolyte material and a solvent is discharged from the nozzle until when the mixture solution reaches the collector 34 is shortened, and a sufficient electrostatic explosion cannot be obtained. Consequently, suitable fibers having a mean fiber diameter of 0.01 µm or more to 1 µm or less cannot be obtained.

The electrostatic explosion is affected by the viscosity or amount of the solution. An optimum voltage to be applied and the distance between the nozzle 33 and the collector 34 can be determined based on a drying state of the solvent in the solution when the unwoven fiber is produced on the collector 34. When the solvent in the unwoven fiber produced on the collector 34 is not sufficiently dried and the fiber is in a wet state, the electrostatic explosion is insufficient. Therefore, in that case, the discharging amount of the mixture solution from the nozzle 33 may be decreased to obtain an appropriate discharging amount. In addition, when the distance between the nozzle 33 and the collector 34 is made larger, a suitable electrostatic explosion is likely to occur. Therefore, when the discharging amount cannot be made smaller in order to obtain high productivity, the distance between the nozzle 33 and the collector 34 may be made larger.

When the discharging amount is small or when the distance between the nozzle 33 and the collector 34 is large, an excessive electrostatic explosion may occur, forming an unwoven fiber in a region broader than a predetermined region. Consequently, the time required to form a required thickness may be longer, and, the productivity may be lowered.

A plurality of nozzles (not shown in the figures) may be used in order to improve the productivity. The distance between the nozzles is preferably 10 mm or more. When the distance between the nozzles is shortened, adjacent nozzles and the charged mixture solution 31 of PVDF, an electrolyte material and a solvent may influence one another because of their charges. Consequently, a sufficient electrostatic explosion cannot be obtained, and suitable fibers having a mean fiber diameter of 0.01 µm or more to 1 µm or less cannot be obtained.

Schematic diagrams of the step of producing the reinforcing membrane are shown in FIGS. 6A, 6B and 6C.

In the present embodiment, an unwoven fabric 36 (FIG. 6B) is formed on the PET substrate 35 (FIG. 6A) by using the electrospinning method. A second domain 22 having no through-hole is generated in a peripheral portion of the resulting unwoven fabric 36 by heat roll pressing (120° C.) (FIG. 6C). In order to generate the second domain 22, a welding treatment using heat or laser, or a technique for filling the same type of a material thereto may also be adopted. The unwoven fabric 36 is used as the reinforcing membrane 2.

Schematic diagrams of the step of producing the electrolyte membrane are shown in FIGS. 7A and 7B.

In the present embodiment, the reinforcing membrane 2 obtained on the PET substrate 35 (FIG. 7A) is impregnated with an electrolyte solution 37. The entire region of the first domain 21 formed in the reinforcing membrane 2 is impregnated with the electrolyte solution 37, and a region of the second domain 22 other than its outer peripheral portion is impregnated with the electrolyte solution 37 (FIG. 7B).

In the present embodiment, an electrolyte solution 37 may be coated onto the reinforcing membrane 2 with a bar coater (not shown in the figures). For coating of the electrolyte solution 37, coating using a slit die, or a printing or spraying method may be adopted, and it is only required that the reinforcing membrane 2 which is constituted of fibers having a high porosity be impregnated with the electrolyte solution 37 without unfilled pores. In the present embodiment, after coating of the electrolyte solution 37, the solvent is volatilized to thus dry the solution. In the present embodiment, the electrolyte solution 37 is coated thereon such that the dried polymer electrolyte membrane 1 has a predetermined thickness.

After the coated electrolyte solution 37 is dried, annealing is carried out to crystallize the electrolyte. The annealing temperature is preferably higher than a glass transition temperature of the electrolyte material by 10° C. or more. When the annealing temperature is low, sufficient crystallization may not occur, and, consequently, durability of the electrolyte membrane 1 cannot be secured. The annealing time is preferably 30 minutes or more to 2 hours or less. When the annealing time is short, sufficient crystallization cannot be obtained. When the annealing time is long, crystallization excessively proceeds. Consequently, the proton conductivity becomes low.

In the present embodiment, after annealing, the PET substrate 35 is stripped therefrom to use the remaining polymer electrolyte membrane 1.

The peripheral portion of the polymer electrolyte membrane 1 onto which an electrolyte has not been coated is welded to the frame 4 (FIG. 3) to form an integrated structure. For formation of the integrated structure, when the frame and the reinforcing membrane are made of the same type of a material, a welding treatment using heat, laser, ultrasonic waves, or a solvent may be adopted. When the frame and the reinforcing membrane are each made of different types of materials, a method of adhering them can also be adopted.

According to the present invention, an unwoven fabric having two domains which are formed with fibers of PVDF is disposed as a reinforcing membrane in an electrolyte membrane for a polymer electrolyte fuel cell, and a domain having no through-hole and protruding from the electrolyte membrane and a frame are formed into an integrated structure by welding, thereby improving the gas sealing capability.

Moreover, such formation of an integrated structure can suppress cross leakage of the gas, thereby improving the power generation efficiency. Furthermore, since the improvement in the gas sealing capability even confines movement of OH radicals which are responsible for deterioration of the electrolyte membrane, power generation properties can be secured for a long term.

Example

1. Production of a Fiber Material

Pellet-like PVDF (manufactured by Arkema; molecular weight: 275,000) was stirred with a rotating and revolving mixer to be dissolved in DMAc, and a solution thereof was prepared. The weight ratio of PVDF:DMAc was a mixing ratio of 2:8.

2. Formation of Fibers

A fiber-producing device (Model Number: NF101 manufactured by Panasonic Factory Solutions Co., Ltd.) used for the electrospinning method was prepared. A 28 G stainless steel nozzle (inner diameter: 0.3 mm, outer diameter: 0.36 mm, needle length: 15 mm) was attached to the tip of a disposable syringe of a volume of 10 mL. Fibers were prepared in conditions where the distance from the collector to the nozzle was 120 mm; a voltage applied between the collector and the nozzle was 15 kV; and the solution-feeding pressure was 30 kPa. The fiber diameters of the fibers produced on the collector had a distribution of 200 nm to 500 nm, and the mean fiber diameter was 300 nm. In addition, a thickness of an unwoven fabric of the fibers was 30 μm.

3. A Method for Forming a Reinforcing Membrane

A heat roll press device (Model Number: NF102, manufactured by Panasonic Factory Solutions Co., Ltd.) was prepared. The temperatures of an upper roll and a down roll were 125° C., the gap between the rolls was 60 μm, and the pressure between the rolls was 12 MPa. The unwoven fabric was held with a PET substrate of a thickness of 38 μm (a portion of the substrate corresponding to the first domain was cut out) and a PET substrate of a thickness of 38 μm, where the former substrate was located on the upper side of the unwoven fabric while the latter substrate was located on the down side. Then, heat roll pressing was carried out. After pressing, the second domain had a transparent sheet-like appearance, and the thickness was 7 μm.

4. A Method for Measuring a Pore Size Distribution

A device for measuring a pore size distribution (Model Number: CFP-1200AEX manufactured by Porous Metrials, Inc.), and a test solution (product name: Galwick, Surface Tention: 15.9 dynes/cm, manufactured by Porous Metrials, Inc.) were prepared, and pore size distributions for the first domain of the reinforcing membrane and the second domain were each measured by the bubble point method. For comparison, the reinforcing membrane before being subjected to heat roll pressing was measured. The size of the samples was Φ25 mm. A range for the pore size measurement is 0.035 μm to 180 μm when using the Galwick solution.

The results are shown in Table 1.

TABLE 1

|  |  | Before pressing | Example After pressing |  | Comparative Example |
|---|---|---|---|---|---|
|  |  |  | First domain | Second domain |  |
| Pore size distribution | Minimum pore size (μm) | 0.65 | 0.65 | Bubble point measurement: None |  |
|  | Maximum pore size (μm) | 1.97 | 1.97 | Bubble point measurement: None |  |
|  | Mean pore size (μm) | 1.00 | 1.00 | Bubble point measurement: None |  |
| Gas leakage amount (Pa · m³/s) |  | — | — | 5.7 × 10⁻⁵ | 1.5 × 10⁻³ |

5. A Method for Measuring a Cross Leakage Amount

A device for gas leakage measurement (Model Number: NF-201 manufactured by Panasonic Corporation) was prepared, and a gas leakage amount for the second domain of the reinforcing membrane was measured by the sniffer method using He gas. For comparison, the measurement was also carried out with respect to a commercially-available electrolyte membrane (product name: GORE-SELECT, manufactured by Nihon Gore K.K.). An amount of the gas which leaked from one surface to the other surface of the measured membrane, namely to the thickness direction of the membrane, was considered as a cross leakage amount. The size of samples was 120 mm×120 mm. The results are shown in Table 1.

With regard to the results of the pore size distribution measurement described in Table 1, by use of the above-mentioned measuring device, the reinforcing membrane is soaked in a liquid whose surface tension has been known in advance, and a pressure was applied to the reinforcing membrane from a state where all pores of the reinforcing membrane were covered by a liquid membrane, and a pore size for the pores, which is calculated from a pressure which destroys the liquid membrane and a surface tension of the liquid, is measured. The following numerical formula is used for the calculation.

$$d = C_r r/P \quad \text{Numerical Formula (1)}$$

In addition, in the formula, d is a pore size of the reinforcing membrane, r is the surface tension of the liquid, P is the pressure which destroys the liquid membrane having the pore size, and C is a constant.

When a flow (wet flow) is measured based on Numerical Formula (1) in a case where the pressure P applied to the reinforcing membrane soaked in the liquid is continuously varied from a low pressure to a high pressure, an initial pressure does not destroy even a liquid membrane having the largest pores, and therefore, the flow is 0. As the pressure is increased, the liquid membrane having the largest pores is destroyed, and a certain flow volume is caused (a bubble point).

As the pressure is further increased, the flow increases depending on the pressure, and a liquid membrane having the smallest pores is destroyed. It accords with a flow in a dry state (dry flow). In the above-mentioned measuring device, a value obtained by dividing a wet flow at a certain pressure by a dry flow at the same pressure is called a cumulative filter flow (unit: %). A pore size of a liquid membrane which is destroyed at a pressure where the cumulative filter flow reaches 50% is defined as a mean flow pore size (μm). Additionally, the maximum pore size (μm) is considered as a pore size of the liquid membrane which is destroyed at a bubble point pressure, while the minimum pore size (μm) is considered as a pore size of the liquid membrane which is destroyed at a pressure where the cumulative filter flow is in a −2σ region of 100%, i.e. 97.7%.

As to the pore size distribution of the reinforcing membrane of the example before heat roll pressing, the minimum pore size was 0.65 μm, the maximum pore size was 1.97 μm, and the mean pore size was 1.00 μm. As to the pore size distribution of the reinforcing membrane after heat roll pressing, the minimum pore size was 0.65 μm, the maximum pore size was 1.97 μm and the mean pore size was 1.00 μm in the first domain. When comparing the pore size distributions after and before heat roll pressing, no changes in the pore size distributions were observed, and thus, it was confirmed that the porosity was maintained. Consequently, when the membrane is impregnated with an electrolyte material, the membrane can be allowed to function as an electrolyte membrane.

In the second domain formed by heat roll pressing, no bubble point existed, and a sheet having no pore size in a measuring range of 0.035 μm to 180 μm according to the device for measuring a pore size distribution was formed. In the gas leakage measurement using He gas, the cross leakage amount was 5.7×10⁻⁵ Pa·m³/sec. As results of measurement of the commercially-available electrolyte membrane in the comparative example, it was confirmed that the membrane of the example had a gas sealing capability equal to or more than $1.5 \times 10^{-3}$ Pa·m³/sec.

A membrane-electrode-frame assembly having an integrated structure in which the peripheral portion of the second domain is welded to the frame has a high gas sealing capability even under conditions of power generation, thus suppressing the cross leakage. Consequently, the power generation efficiency is improved. Furthermore, deterioration of the membrane due to effects of the cross leakage is prevented, and durability of the electrolyte membrane is improved. Consequently, properties of the fuel cell can be secured for a long term.

INDUSTRIAL APPLICABILITY

The membrane-electrode-frame assembly of the present invention suppresses deterioration of power generation properties due to gas cross leakage, improves durability of the electrolyte membrane, and can industrially and widely be utilized as a polymer electrolyte fuel cell exhibiting superior productivity. A polymer electrolyte fuel cell has features that it operates at a low temperature and that it can be downsized because of its high output current density. Therefore, a polymer electrolyte fuel cell is considered promising for use in a household cogeneration system, a fuel cell-powered automobile, a base station for mobile communication, etc.

REFERENCE SIGNS LIST

1: a polymer electrolyte membrane
2: a reinforcing membrane
4, 111a and 111b: a frame
21: a first domain
22: a second domain
51: an anode-side catalyst layer
52: a cathode-side catalyst layer
53 and 102: a gas diffusion layer

The invention claimed is:

1. A membrane electrode assembly for a polymer electrolyte fuel cell, the membrane electrode assembly comprising:
  a polymer electrolyte membrane;
  catalyst layers and gas diffusion layers which are disposed at both surfaces of the polymer electrolyte membrane; and
  an unwoven fabric having a first domain and a second domain, wherein:
  the first domain is included in a center in the thickness direction of the polymer electrolyte membrane,
  the second domain is disposed around an outer peripheral portion of the first domain and protrudes from a peripheral portion of the polymer electrolyte membrane,
  the first domain and the second domain includes pores,
  the second domain has a pore size smaller than a pore size of the first domain,
  the second domain is one in which the nonwoven fabric is subjected to welding treatment using heat or laser, or filling a same type of a material thereto,
  the first domain and the second domain are made of one continuous nonwoven fabric,
  the pore size of the first domain is more than 0.035 µm and 5 µm or less, and
  the pore size of the second domain is 0.035 µm or less.

2. The membrane electrode assembly for a polymer electrolyte fuel cell according to claim 1, wherein:
  fibers of the unwoven fabric comprise a polyvinylidene difluoride (PVDF) polymer, a polyvinyl fluoride (PVF) polymer, a copolymer comprising a plurality of monomer units constituting a polymer selected from the group consisting of PVDF and PVF, or a mixture of these polymers, and
  a mean fiber diameter of the fibers is 0.01 µm or more and 1 µm or less.

3. The membrane electrode assembly for a polymer electrolyte fuel cell according to claim 1, wherein pores in the first domain are filled with a perfluorocarbon polymer having a sulfonic group.

4. A membrane-electrode-frame assembly for a polymer electrolyte fuel cell, the membrane-electrode-frame assembly comprising:
  the membrane electrode assembly according to claim 1; and
  a frame which holds a peripheral portion of the membrane electrode assembly and which is formed with a resin,
  wherein the membrane electrode assembly is fixed to the frame.

5. The membrane-electrode-frame assembly according to claim 4,
  wherein the membrane electrode assembly and the frame are formed into an integrated structure.

6. A polymer electrolyte fuel cell comprising:
  one or more single cells which are stacked,
  wherein each of the one or more single cells includes a pair of separators, and
  the membrane-electrode-frame assembly for a polymer electrolyte fuel cell according to claim 4 is held between the pair of separators.

7. The membrane electrode assembly for a polymer electrolyte fuel cell according to claim 1, wherein:
  the thickness of the first domain is greater than the thickness of the second domain.

8. The membrane electrode assembly for a polymer electrolyte fuel cell according to claim 1, wherein the first region holds the electrolyte and the second region does not hold the electrolyte.

9. The membrane electrode assembly for a polymer electrolyte fuel cell according to claim 1, wherein the polymer electrolyte membrane does not include a sheet material in addition to the nonwoven fabric.

10. The membrane electrode assembly for a polymer electrolyte fuel cell according to claim 1, wherein the polymer electrolyte membrane has only the first region and the second region.

11. The membrane electrode assembly for a polymer electrolyte fuel cell according to claim 1, wherein the polymer electrolyte membrane has pores on the entire surface thereof.

* * * * *